Aug. 17, 1943.  E. W. BAGGOTT  2,327,238
HYDRAULIC TRANSMISSION
Filed Feb. 26, 1942  2 Sheets-Sheet 1
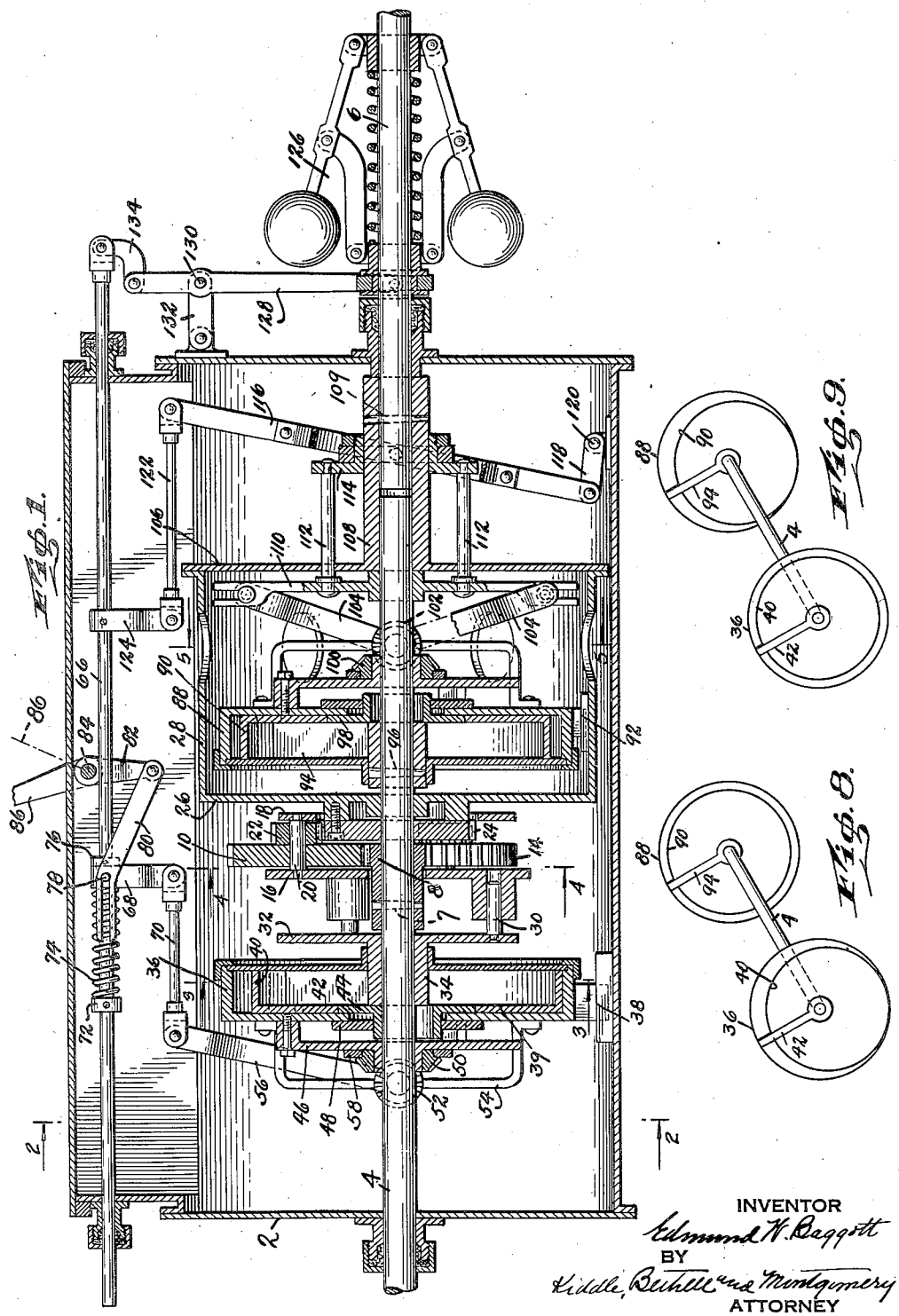
INVENTOR
Edmund W. Baggott
BY
Kiddle, Bethell and Montgomery.
ATTORNEY Aug. 17, 1943.  E. W. BAGGOTT  2,327,238
HYDRAULIC TRANSMISSION
Filed Feb. 26, 1942  2 Sheets-Sheet 2
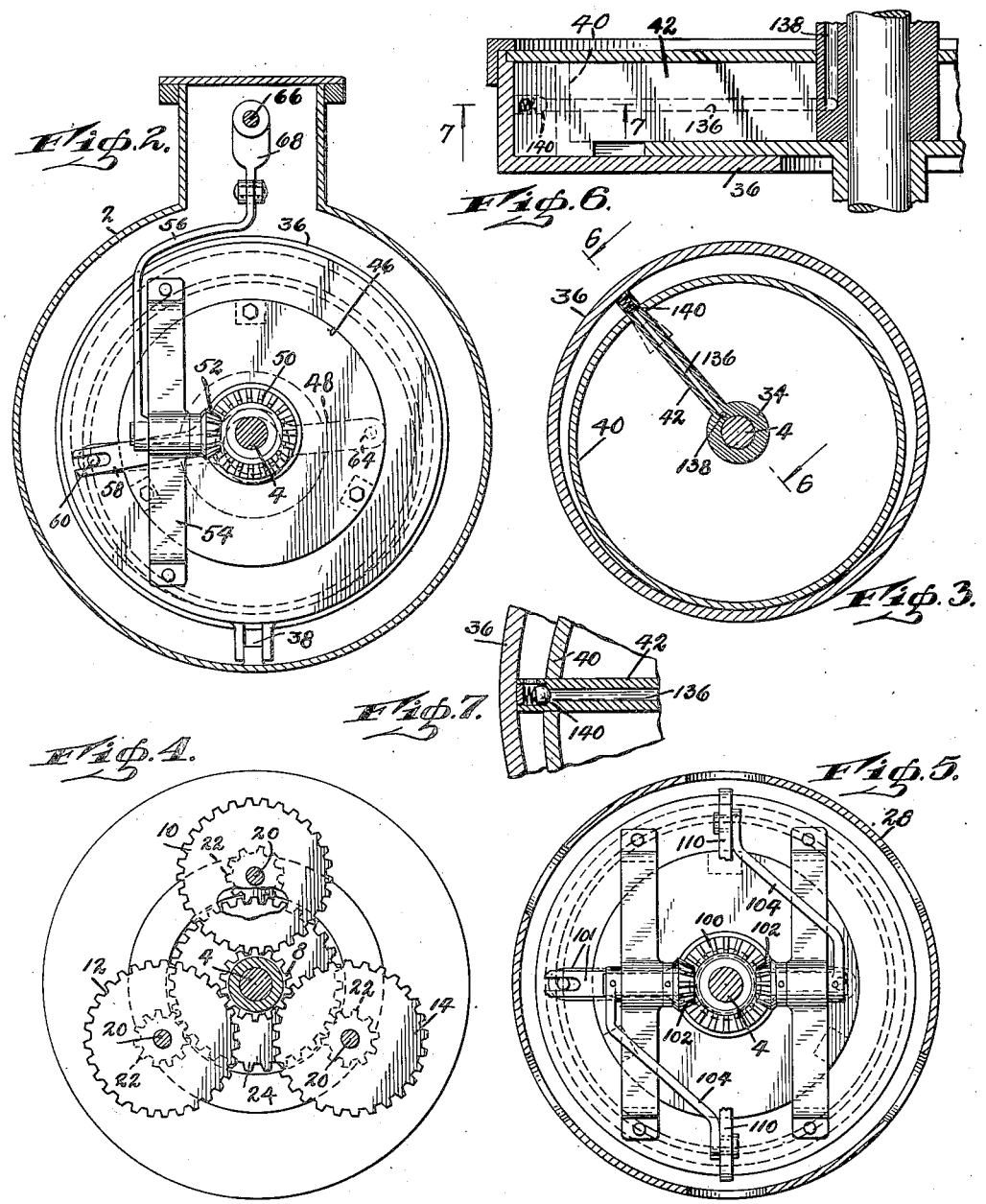
INVENTOR
Edmund W. Baggott
BY
Liddle, Bethell and Montgomery
ATTORNEYS.

Patented Aug. 17, 1943

2,327,238

UNITED STATES PATENT OFFICE 2,327,238

HYDRAULIC TRANSMISSION

Edmund W. Baggott, Brooklyn, N. Y., assignor of one-third to Charles Scotson and one-third to Harold B. Kaempf, both of New York, N. Y.

Application February 26, 1942, Serial No. 432,425

12 Claims. (Cl. 74—293)

This invention relates to an improved hydraulic transmission for transmitting power from a driving member to a driven member, and the primary object of the invention is the provision of a simplified construction, as compared with the hydraulic transmissions of the prior art, and to provide for an infinite number of speed ratios between the driving member and the driven member.

In the accompanying drawings I have illustrated one embodiment of the invention:

Fig. 1 is a side elevational sectional view of one form that my invention may take;

Fig. 2 is a section on the line 2—2 of Fig. 1;

Fig. 3 is a section on the line 3—3 of Fig. 1;

Fig. 4 is a section on the line 4—4 of Fig. 1;

Fig. 5 is a section on the line 5—5 of Fig. 1;

Fig. 6 is a section on the line 6—6 of Fig. 3;

Fig. 7 is a fragmentary view taken on the line 7—7 of Fig. 6; and

Figs. 8 and 9 are diagrammatic explanatory views.

Referring now to the drawings in detail: In the form illustrated my invention comprises an outer casing 2 which is always filled with oil or other liquid. 4 designates the driving member. In this instance this member is a shaft extending through one end of the casing axially of the casing. Extending through the other end of the casing 2 is the driven member or shaft 6. As will be obvious to those skilled in this art, the primary purpose of my apparatus is to provide variable power transmission between the driving member 4 and driven member 6, the former being connected, as will be understood, to any suitable prime mover.

More specifically my invention provides a hydraulic drive or transmission of extremely simple construction and embodying but few parts whereby driven member 6 can be driven at an infinite number of speeds with varying torque.

Keyed to the driving shaft 4, as shown at 7, is a small gear or pinion 8 meshing with three gears 10, 12 and 14 disposed about the periphery of the pinion, these gears 10, 12 and 14 being supported in spaced discs 16 and 18 concentric with the pinion 8 and driving shaft 4. Studs 20 constituting the bearings for the gears 10, 12 and 14 each carry a pinion 22, which mesh with a gear 24 bolted to the wall 26 of a rotary casing 28 mounted within the main casing 2. The casing 28 constitutes part of what I shall term the second power transmitting unit or pump of my transmission.

The disc 16, above referred to, is connected by pins or other connection 30 to a disc 32 which also surrounds and is concentric with the driving shaft 4.

The disc 32 is provided with a hub 34 extending into the non-rotatable casing 36 of the first unit of the transmission. This casing 36 is mounted concentric with the driving shaft 4 but is held against rotation through the lugs 38 on the bottom of the casing and on the interior of the non-rotatable main casing or housing 2.

Within the first power transmitting unit or pump casing 36 is a cup-shaped rotor 40, the hub 34 of the disc 32 extending into this rotor also.

Extending radially of the rotor 40 is an impeller 42, this impeller extending through the rim of the rotor 40 and across the space between this rim and the peripheral wall of the casing 36.

The side wall or bottom 39 of the cup-shaped rotor 40 is cut out to accommodate a control disc or shifting disc 44 which surrounds the driving shaft 4. This disc is so constructed that it can be moved radially with respect to said driving shaft thereby to vary the setting of the rotor 40 within the casing 36. For example, as shown in Fig. 1, the rotor 40 is in its extreme eccentric position with respect to the casing 36 as I have illustrated diagrammatically in Fig. 8 and by adjusting the control or shift disc 44 the rotor 40 can be shifted bodily until it is concentric with the casing 36, as illustrated diagrammatically in Fig. 9. The purpose of thus shifting the rotor with respect to its enclosing casing will be brought out in more detail hereinafter. The drive for the rotor 40, it will be understood, is through the impeller 42 which, as above mentioned, is fast on hub 34 of the disc 32.

In order that the control disc 44 may be shifted or bodily moved as above pointed out the face of the front wall of the fixed casing 36 is provided with a plate 46, and between this plate 46 and the wall of the casing 36 and surrounding the hub of the control member 44 is a lever plate 48, which shifts with the control disc 44.

Mounted for free rotation on the exterior of the plate 46 and concentric with the driving shaft 4 is a bevel gear 50 in constant mesh with a small bevel gear 52 mounted in a bracket 54 secured to the front wall of casing 36. A lever 56 is connected at one end to this gear 52 so that when the lever is rocked rotary motion will be imparted to 52 to rotate the gear 50.

Connected to the gear 50 or integral therewith is an arm 58 which is forked at its free end, this fork engaging a pin 60 carried in the end of the lever 48, this lever being pivoted at 64. The lever plate 48 is connected to the control member 44.

As a result of the construction just described, it will be apparent that when the lever 56 is rocked rotary motion will be imparted to the gear 50 to pivot the lever plate 48 thereby to shift the control disc 44 bodily and correspondingly adjust or vary or shift the rotor 40 within the casing 36 of the first unit.

The control disc 44 is adapted to be shifted manually and automatically. With respect to manual shifting: 66 designates a long rod extending the entire length of the fixed casing 2. Mounted on this rod is an arm 68 connected by a link 70 to the outer end of the lever 56. The rod 66 is provided with a fixed collar 72 and between this collar and the arm 68 is a spring 74. This spring permits movement of 68 toward 72 but movement of 68 in the opposite direction is limited by a collar 76 which is fast to the rod 66.

The outer end of the arm 68 is provided with a pin 78 receiving the forked end of a link 80 which is pivoted to lever 82, the latter being pivoted at 84. The outer end 86 of the lever 82 is at the exterior of the casing 2.

With the parts in the position shown in Fig. 1, it will be quite apparent that if 86 be moved toward the dotted line position shown in Fig. 1 rotation will be imparted to the gear 50 in the proper direction to move the rotor 40 within the casing 36 until 40 has moved from the position shown in Fig. 8 to that shown in Fig. 9; in other words, from an eccentric position to concentric position with respect to casing 36.

Referring now to the second unit: I have already made reference to casing or housing 28 and pointed out that the same is rotary. Within this casing I provide the second unit which is practically a duplicate of the first unit, but for purposes of clarity it will be necessary to describe this second unit in detail.

Within the rotary casing 28 and concentric with the drive shaft 4 is the casing 88 of the second unit, and within this casing is a rotor 90. This casing and rotor correspond to casing 36 and rotor 40 of the first unit. In this second unit, however, the casing 88 is fixed to the casing 28 as shown at 92 so as to be rotatable therewith. Casing 36 of the first unit, it will be remembered, is stationary.

An impeller 94 is provided for the second unit. This impeller is a duplicate of the impeller 42 of the first unit. The impeller 94 is keyed to the shaft 4 at 96. Rotor 90 is adapted to be shifted within its casing 88 through the medium of a shift or control disc 98 which is similar to the control disc 44 of the first unit. Shifting of 98 is accomplished through gears 100 and 102, the gears 102 being rotated through the medium of arms 104. End wall 106 of the casing 28 is provided with a hub 108 surrounding the adjacent ends of the driving shaft 4 and driven shaft 6, this hub being keyed or pinned to the latter as shown at 109. Mounted on the driving shaft 4, within the casing 28, and adjacent the wall 106 thereof is a spider 110, connected by suitable connections 112 to a collar 114 on the hub 108, this collar being slidable on the hub.

Connected to the collar 114 is a lever 116, the inner end of which is pivoted to a link 118 pivoted to the bottom wall of the casing 2, as shown at 120. The outer end of the lever 116 is connected to the rod 66 by link 122 and arm 124, the latter being pinned to the rod.

It will be obvious that by moving the rod 66 to the left, as viewed in Fig. 1, the collar 114 will be moved along the hub 108 imparting motion in the same direction to the spider 110, thereby to rock the levers 104 and impart rotation to gears 102, to rotate the gear 100 which is connected to control member 98 through levers 101 thereby to shift the rotor 90 of the second unit radially with respect to its casing 88 from the concentric position shown in Fig. 8 toward the eccentric position shown in Fig. 9.

The end of the driven shaft 6 beyond the end of the casing 2 is provided with a ball governor 126. Lever 128 of this governor is pivoted at 130 to a link 132 pivoted on the adjacent end wall of the casing 2. At its outer end the lever 128 is connected by a link 134 to the outer end of the rod 66. The effect of all this is that when the balls of the governor 126 move outwardly due to rotation of the driven shaft 6 the rod 66 will be gradually shifted to the left, as viewed in Fig. 1, shifting the rotors 40 and 90 of the first and second units in their respective casings 36 and 88.

The operation of my improved apparatus is as follows: The parts in Fig. 1 are shown in low speed position, and as will be seen from the diagram of Fig. 8, under these conditions the rotor 40 of the first unit is in its extreme eccentric position with respect to its casing 36 while the rotor 90 of the second unit is concentric with its casing 88. Under these conditions rotation of the driving shaft 4 will drive the pinion 8 but inasmuch as the rotor 40 is in its extreme eccentric position and hence locked against rotation, because the casing 36 is locked to the fixed housing 2 at 38, the pinion 8 will rotate each of the gears 10, 12 and 14 on its own axis, which will drive the pinions 22, in turn driving the large gear 24. This gear 24 is fastened directly to the face of the rotary casing 28 so that the latter is rotated, and inasmuch as its hub 108 is keyed to the driven shaft 6, the shaft 6 will be driven. At the same time, of course, the casing 88 of the second unit is rotated inasmuch as it is keyed to 28. Rotor 90 of the second unit is also rotated direct from the driving shaft 4, but inasmuch as it is set concentric with 88 there is no driving effect through 90 on the driven shaft.

As the shaft 6 speeds up the balls of governor 126 will move outwardly to move the rod 66 toward the left, as viewed in Fig. 1. This movement of the rod 66 will effect rocking of the levers 116 and 56 and through the connections above described will effect rotation of the gears 100 and 50 gradually to shift the control discs 98 and 44 into position so that the rotor 40 of the first unit will be moved gradually from the full eccentric position shown in Fig. 8 to the concentric position shown in Fig. 9 while the rotor 90 of the second unit will be shifted in the opposite sense, that is, from the concentric position of Fig. 8 to the full eccentric position of Fig. 9. As soon as the rotor 40 of the first unit moves from its extreme eccentric position with respect to its fixed casing, the rotor is free to turn because the oil is no longer trapped between the rotor 40 and casing 36 and impeller 42, and inasmuch as the impeller 42 is connected to the housing of gears 10, 12 and 14 the latter are now free to move in a planetary fashion about the pinion 8, instead of these gears merely rotating on their individual axes as was the case when rotor 40 was held against rotation. The rotor 90 of the second unit is moving at this time toward its extreme eccentric position with respect to its casing 88. Consequently there is a gradual throttling of the movement of the oil in the second unit, because the rotor 90 is gradually moving toward the outer casing 88 and the oil is trapped between the rotor and casing and impeller 94, thereby increasing the drag on the casing 88 and hence on the casing 28, and a gradual increase in the speed of the driven shaft 6, until finally the rotor 90 is no longer able to rotate with respect to casing 88, and 88 is in effect locked to the shaft 4 by the pin 96. Inasmuch as 88 is locked to the casing 28 the latter in effect is locked to 4 and we have casing 28 traveling at the same linear speed as the drive shaft 4 and inasmuch as 28 and the driven shaft 6 are keyed together shaft 6 is now rotating at the same speed as 4.

It is to be noted under these conditions, that is, extreme eccentric position of rotor 90 of the second unit with respect to 88, the rotor 40 of the first unit is concentric with its casing 36 so that there is no opposition to free rotation of the rotor 40 within its casing 36.

It will be appreciated that between the low speed position illustrated in Fig. 8 and the high speed position illustrated in Fig. 9 an infinite number of speed gradations are obtained between the speeds of the driving shaft 4 and driven shaft 6.

When it is desired to place the parts in neutral position, that is, so that the driving shaft 4 may be rotated without any motion at all being imparted to the driven shaft 6, it is merely necessary to slow the shaft 4 to the point where the parts are in the low speed position of Figs. 1 and 8, then to move the lever 86 toward the dotted line position of Fig. 1. This moves the rotor 40 of the first unit concentric with its casing 36, and both rotors 40 and 90 will now be concentric with their respective casing 36 and 88.

Under these conditions the gears 10, 12 and 14 would simply move in a planetary fashion about the periphery of the pinion 8 and at the same time the pinions 22 would simply move in a planetary fashion about the periphery of the large gear 24, and although 24 is rigidly secured to the wall 26 of the casing 28 the casing 28 would not be rotated and hence there would be no driving effect on the driven shaft 6 from this casing. Furthermore, although the drive shaft 4 is keyed direct to the rotor 90 of the second unit, and although the casing 88 of this unit is non-rotatable with respect to the casing 28, there is no driving effect through this mechanism on casing 28 and hence on the driven shaft 6 because of the fact that the rotor 90 is set concentric with respect to 88. Under these conditions, therefore, the shaft 4 is rotating while the driven shaft 6 is stationary.

With reference more specifically to Figs. 3, 6 and 7: Each of the impellers 42 and 94 is bored longitudinally, as shown at 136. At its inner end, that is, the end adjacent the shaft 4, this bore connects with a bore 138 extending parallel to the shaft 4 and communicating with the interior of the casing 2. At the outer end each impeller is provided with a spring-loaded check valve 140 at the end of bore 136. By reason of this construction I am assured that the space between the rotors 42 and 94 and their respective casings will always be filled with oil, the valve 140 lifting to permit oil to flow from the casing 2 through the conduits 138 and 136 to the spaces between the rotors and their casing, upon a drop in pressure in these spaces back of the impellers.

It is to be understood that the entire apparatus is kept filled with oil or other suitable fluid.

It will be understood that various changes may be made in the details of construction and arrangement of parts herein shown and described without departing from the spirit and scope of this invention.

What I claim is:

1. In a hydraulic transmission for transmitting power from a driving member to a member to be driven, the combination of two units each comprising a rotor, an enclosing casing and an impeller extending into the space between the rotor and casing, a liquid in the said space in each unit, a gear train connecting the driving member to one of said rotors, the other rotor directly connected to said driving member, means for connecting the casing of the last mentioned rotor to the member to be driven, and means for varying the relative positions of each rotor and its casing to vary the speed of the driven member relatively to the driving member.

2. In a hydraulic transmission for transmitting power from a driving member to a member to be driven, the combination of a first and second unit each of which comprises a rotor surrounding the driving member, a surrounding casing and an impeller extending into the space between the rotor and casing, liquid in said space, an additional casing enclosing said second unit and connected to the casing of the second unit and to the member to be driven, a gear train connecting the driving member to one of said rotors, the other rotor being directly connected to said driving member, means for connecting the casing of the last mentioned rotor to the member to be driven, and means for varying the relative positioning of the rotor and casing of each unit to vary the speed of the driven member relatively to the driving member.

3. In a hydraulic transmission for transmitting power from a driving member to a member to be driven, the combination of two units each comprising a rotor, an enclosing casing and an impeller extending into the space between the rotor and casing, a liquid filling the space in each unit between the rotor and casing unoccupied by the impeller, a gear train connecting the driving member to one of said rotors, the other rotor being directly connected to said driving member, means for connecting the casing of the last mentioned rotor to the member to be driven, and means for shifting each of said rotors relatively to its impeller to vary the position of each of said rotors relatively to its casing to vary the speed of the driven member relatively to the driving member.

4. In a hydraulic transmission for transmitting power from a driving member to a member to be driven, the combination of a first and second unit each comprising a rotor, an enclosing casing and an impeller in the space between the rotor and casing, a liquid filling the space in each unit between the rotor and casing unoccupied by the impeller, an additional casing enclosing said second unit and directly connected to the casing of the second unit and to the member to be driven, a planetary gear train connected to the driving member, to said additional casing and to the rotor of the first unit, and means for shifting the rotors of each unit relatively to its impeller to vary the positioning of each rotor in its casing to effect a variation in speed between the driving member and the member to be driven.

5. In a hydraulic transmission for transmitting power from a driving member to a member to be driven, the combination of a first unit and a second unit, each comprising a rotor, an enclosing casing and an impeller in the space between the rotor and casing of each unit, liquid in the said space, a gear train connecting the driving member to one of said rotors, the other rotor being directly connected to said driving member, means for connecting the casing of the last mentioned rotor to the member to be driven, and means within each casing operable from the exterior thereof and engaging said rotors for moving the same bodily relatively to their respective casings and impellers with the rotor in operation so as to set one rotor eccentric to its casing while the other moves to concentric position, thereby to vary the speed of the member to be driven without varying the speed of the driving member.

6. In a hydraulic transmission for transmitting power from a driving member to a member to be driven, the combination of a first unit, a second unit and an intermediate gear train, each unit comprising a rotor, an enclosing casing and an impeller in the space between the rotor and casing, liquid in the space between each rotor and casing unoccupied by the impeller, an additional casing for the second unit to which the casing immediately surrounding the rotor is fixed, said additional casing being directly connected to the member to be driven, gearing connecting the rotor of the first unit and the said additional casing of the second unit to the driving member, and means for adjusting the rotors of the said two units in their respective casings relatively to their impellers so that when the eccentricity of one unit is being reduced that of the other unit is being increased thereby to vary the speed of the member to be driven relatively to the driving member.

7. In a hydraulic transmission for transmitting power from a driving member to a member to be driven, the combination of two units each comprising a rotor, an enclosing casing and an impeller extending into the space between the rotor and casing, liquid in said space, a gear train connecting the driving member to one of said rotors, the other rotor being directly connected to said driving member, means for connecting the casing of the last mentioned rotor to the member to be driven, and means actuated by the member to be driven to shift both rotors simultaneously radially of their respective casings and impellers automatically to vary the speed of the driven member relatively to that of the driving member.

8. In a hydraulic transmission for transmitting power from a driving member to a member to be driven, the combination of two units each comprising a rotor, an enclosing casing and an impeller extending into the space between the rotor and casing, liquid in said space, a gear train connecting the driving member to one of said rotors, the other rotor being directly connected to said driving member, means for connecting the casing of the last mentioned rotor to the member to be driven, and a governor driven off the member to be driven for shifting both rotors simultaneously but in opposite directions relatively to their respective casings automatically to vary the speed of the driven member relatively to that of the driving member.

9. In a hydraulic transmission for transmitting power from a driving member to a member to be driven, the combination of a first unit, a second unit and an intermediate gear train, each unit comprising a rotor, an enclosing casing and an impeller in the space between the rotor and casing, a liquid in said space, an additional casing for the second unit fixed to the casing immediately surrounding the rotor of the second unit and directly connected to the member to be driven, gearing connecting the rotor of the first unit and the said additional casing to the driving member, and means operated by the member to be driven for shifting said rotors relatively of their impellers and radially of their respective casings toward and from the axes of their casings thereby to effect variation in the relative speeds of the driving and driven members.

10. In a hydraulic transmission for transmitting power from a driving member to a member to be driven, the combination of a first unit comprising a rotor, a fixed casing and an impeller extending through the rotor into the space between the rotor and casing to be driven by the rotor, a second unit comprising a rotor, a rotatable casing and an impeller extending through the rotor into the space between the rotor and casing to be driven by the rotor, gearing driven off the driving member and connected to the rotor of the first unit and to the casing of the second unit, the rotor of the second unit being directly connected to the driving member, and the casing of the second unit being connected to the member to be driven.

11. In a hydraulic transmission for transmitting power from a driving member to a member to be driven, the combination of a first unit and a second unit each comprising a rotor, a casing therefor and an impeller extending through the rotor periphery into the space between the rotor and casing to be driven by the rotor, the casing of the first unit being non-rotatable, a pinion carried by the driving member, planetary gearing driven thereby and connected to the rotor of the first unit, and to the casing of the second unit, the latter being directly connected to the member to be driven, while the rotor of the second unit is connected to the driving member.

12. In a hydraulic transmission for transmitting power from a driving member to a member to be driven, the combination of a first unit comprising a fixed casing, a rotor within the casing and an impeller extending radially of the rotor into the space between the rotor and casing to be driven by the rotor, a geared connection between said rotor and the driving member, a second unit comprising a rotor, a casing, an impeller between the rotor and casing, a rotary casing surrounding the second unit and connected to the said gearing and fixed to the first mentioned casing of the second unit, the said rotary casing being directly connected to the member to be driven and the rotor and impeller of the second unit being directly connected to the driving member.

EDMUND W. BAGGOTT.